(12) United States Patent
 Shibasaki

(10) Patent No.: US 8,477,438 B2
(45) Date of Patent: Jul. 2, 2013

(54) LENS APPARATUS

(75) Inventor: Gou Shibasaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 329 days.

(21) Appl. No.: 12/944,146

(22) Filed: Nov. 11, 2010

(65) Prior Publication Data
US 2011/0128638 A1 Jun. 2, 2011

(30) Foreign Application Priority Data

Dec. 2, 2009 (JP) ................... 2009-274628

(51) Int. Cl.
*G02B 7/02* (2006.01)
(52) U.S. Cl.
USPC ........................................... 359/818
(58) Field of Classification Search
USPC ................. 359/704, 818, 822, 823, 827–830
See application file for complete search history.

(56) References Cited

U.S. PATENT DOCUMENTS 6,389,238 B1 * 5/2002 Suzuki ..................... 396/534
2001/0043406 A1 11/2001 Mori
2004/0264001 A1 12/2004 Tsuchiya et al.

FOREIGN PATENT DOCUMENTS

| EP | 1 475 959 A1 | 11/2004 |
| JP | 2001-333315 A | 11/2001 |
| JP | 2004-333778 A | 11/2004 |

* cited by examiner

*Primary Examiner* — Joseph P Martinez
(74) *Attorney, Agent, or Firm* — Rossi, Kimms & McDowell LLP

(57) ABSTRACT

Provided is a lens apparatus capable of attaching an optical accessory on an object side thereof, in which: a lens protection lens barrel at an object-side end of the lens apparatus is retracted in an optical axis direction in response to attachment of an optical accessory support lens barrel supporting the optical accessory without changing placement of an optical system of the lens apparatus; and the lens protection lens barrel retracted in the optical axis direction is returned to a position before the attachment of the optical accessory support lens barrel by detaching the optical accessory support lens barrel from the lens apparatus.

11 Claims, 9 Drawing Sheets

LENS APPARATUS

BACKGROUND OF THE INVENTION

1. Field of the Invention

The present invention relates to a lens apparatus capable of attaching an optical accessory on an object side thereof.

2. Description of the Related Art

In general, a lens apparatus of an image pickup apparatus such as a camera or a video camera has an object-side end of a lens barrel protruded beyond a lens on a foremost surface toward an object side in order to protect the lens from damages when the lens apparatus is placed on something. Hereinbelow, the lens barrel protruded beyond the foremost lens toward the object side is referred to as a lens protection lens barrel.

Conventionally, optical accessories to be attached to a front side (object side) of such lens apparatus are commercially available and, for example, an optical filter, a teleconverter, a wide converter, a wide attachment, a fisheye attachment, and a close-up lens are well known (for example, Japanese Patent Application Laid-Open No. 2001-333315). The optical accessories include an optical accessory in which an outer diameter of an optical element in a rearmost portion is larger than that of the lens protection lens barrel. The optical accessory is designed so as to avoid interference between the optical element and the lens apparatus when the optical accessory is attached to the lens apparatus.

The attachment of the optical accessory to the lens apparatus is described hereinbelow referring to the attachment of an optical filter to the lens apparatus as an example. The attachment of the optical filter to the lens apparatus is performed via an optical accessory support lens barrel. An outer peripheral portion of the optical filter and an inner peripheral portion of the optical accessory support lens barrel are provided with screw portions, and the optical filter is fixed to the optical accessory support lens barrel by screwing the screw portions together. An inner diameter of an attachment portion of the optical accessory support lens barrel and an outer diameter of an optical accessory attachment portion of the lens apparatus are substantially identical to each other. At the time of the attachment, the optical accessory support lens barrel is firstly inserted from the front side of the lens apparatus. Subsequently, when a rear end of the optical accessory support lens barrel comes in contact with a flange portion of an outer peripheral portion of the lens apparatus, a locking screw of the optical accessory support lens barrel is tightened. On the inner diameter side of the attachment portion of the optical accessory support lens barrel, an arc-shaped locking member having one end fixed to the optical accessory support lens barrel is disposed, and a part of the locking member, which is pressed to be elastically deformed when the locking screw is tightened, is engaged with a groove provided in an outer periphery of the lens apparatus, and the optical accessory support lens barrel can be thereby fixed to the lens apparatus.

On the other hand, there is proposed an image pickup apparatus including a retractable lens apparatus as a part thereof in which a switch for detecting attachment of an optical accessory support lens barrel capable of attaching an optical accessory on the front side thereof is provided, and the position of an object-side end of the retractable lens apparatus is limited to a range rearward of a rear end of an optical element of the optical accessory based on the operation of the detection switch (for example, Japanese Patent Application Laid-Open No. 2004-333778).

In general, in order to prevent the occurrence of vignetting in a shooting optical system in which the optical accessory is attached to the lens apparatus, as an interval between the foremost lens of the lens apparatus and the optical element of the optical accessory increases, a radial dimension of the optical element of the optical accessory needs to be increased correspondingly. However, among optical accessories, there is an optical accessory in which it is difficult to reduce the interval between the optical element of the optical accessory and the foremost lens of the lens apparatus due to a restriction resulting from interference between the optical element and the object-side end of the lens protection lens barrel of the lens apparatus. This condition applies to many of the optical accessories each having the outer diameter of the optical element in the rearmost portion larger than the outer diameter of the lens protection lens barrel. Consequently, there has been the problem in that increases in size and weight of such optical accessories to be attached to conventional lens apparatuses are inevitable.

Japanese Patent Application Laid-Open No. 2004-333778 discloses a method of reducing the size of an optical accessory by reducing an interval between the foremost surface of the lens apparatus and the optical accessory with its use limited to a wide-side zoom range shorter than conventional intervals. However, the lens apparatus is limited to the retractable lens apparatus in which the foremost surface moves back and forth during zooming, and the method is not applicable to optical accessories in general.

SUMMARY OF THE INVENTION

An object of the present invention is to solve the above-mentioned problem, and to provide a lens apparatus advantageous in achieving reductions in size and weight of an optical accessory in which it has been difficult to reduce an interval between an optical element and a foremost lens of the lens apparatus due to a restriction resulting from interference between the optical element and a lens protection lens barrel.

In order to achieve the above-mentioned object, the present invention provides a lens apparatus capable of attaching an optical accessory on an object side thereof, including a lens protection lens barrel, in which: the lens protection lens barrel at an object-side end of the lens apparatus is retracted in an optical axis direction in response to attachment of an optical accessory support lens barrel supporting the optical accessory without changing placement of an optical system of the lens system; and the lens protection lens barrel retracted in the optical axis direction is returned to a position before the attachment of the optical accessory support lens barrel by detaching the optical accessory support lens barrel from the lens apparatus.

According to the lens apparatus of the present invention, an optical element of the optical accessory can be moved close to a foremost lens of the lens apparatus without a restriction resulting from interference with the lens protection lens barrel, and hence the lens apparatus advantageous in achieving reductions in size and weight of the optical accessory can be provided.

Further features of the present invention will become apparent from the following description of exemplary embodiments with reference to the attached drawings.

DESCRIPTION OF THE EMBODIMENTS

The present invention is described in detail based on embodiments illustrated in FIGS. 1A to 9B.

First Embodiment

Figure 1A:
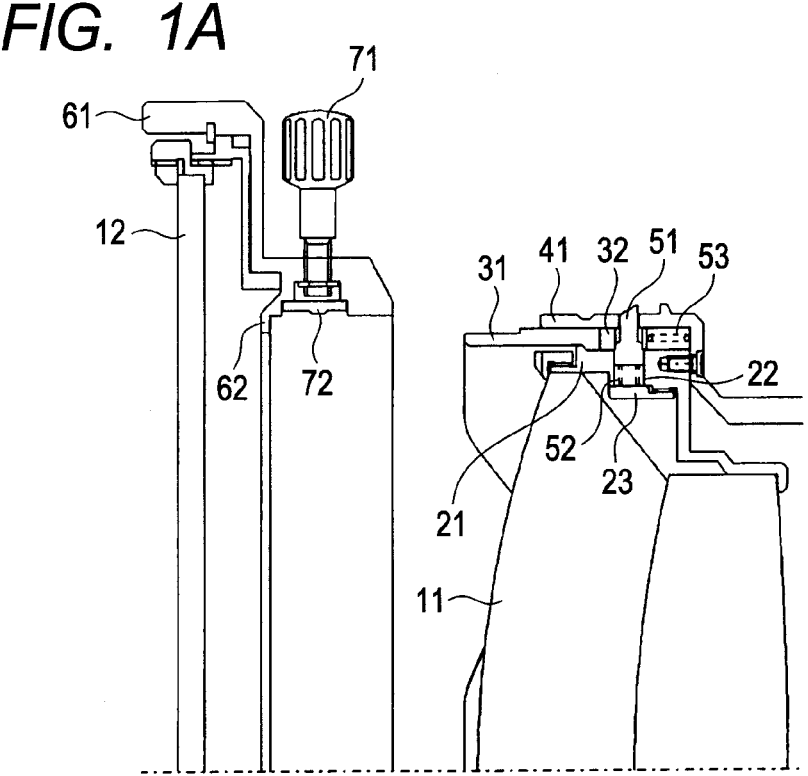
FIG. 1A is a side cross-sectional view of a lens apparatus and an optical accessory according to a first embodiment.
Figure 1B:
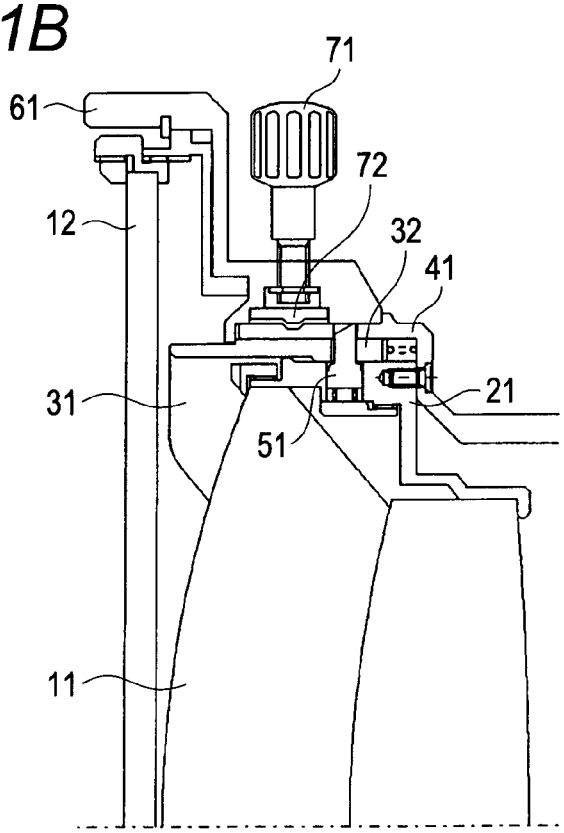
FIG. 1B is a side cross-sectional view illustrating a state in which the optical accessory is attached to the lens apparatus in the first embodiment.
Figure 2A:
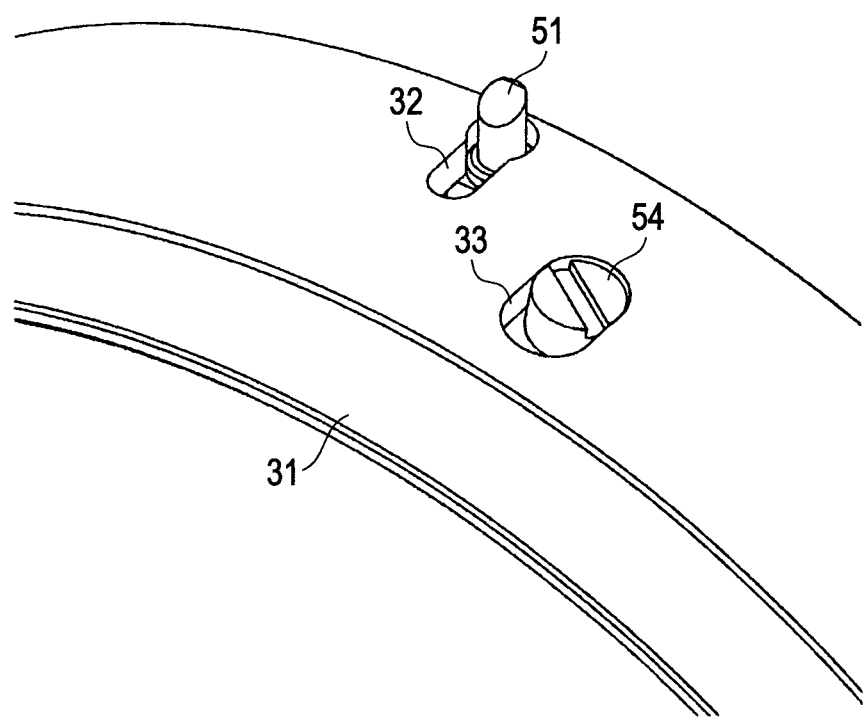
FIG. 2A is a perspective view illustrating a structure in the vicinity of a locking hole.
Figure 2B:
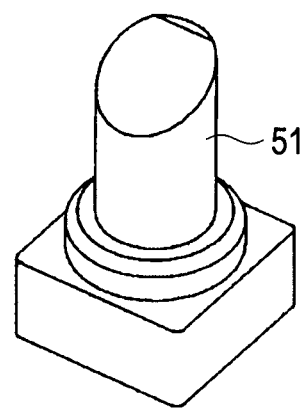
FIG. 2B is a perspective view of a stopper dowel.

FIGS. 1A and 1B are side cross-sectional views of principal portions in a first embodiment of a lens apparatus to which the present invention is applied. The lens apparatus is a wide-angle type lens apparatus in which an object-side end of a lens protection lens barrel 31 is protruded forward more than a lens 11 which is the foremost lens of the lens apparatus, and notches are provided in the lens barrel so as to prevent four corners of an image pickup range from being vignetted. An outer diameter of the lens protection lens barrel 31 is fitted in an accessory fixing lens barrel 41, and is slidable. In addition, an inner diameter of the lens protection lens barrel 31 is fitted on a lens support lens barrel 21, and is slidable. A taper is provided at an object-side end of a portion of the lens protection lens barrel 31 fitted on the lens support lens barrel 21, and a similar taper is provided at an object-side end of a portion of the lens support lens barrel 21 fitted in the lens protection lens barrel 31. As illustrated in FIG. 2A, a keyhole-shaped locking hole 32 and an elongated hole 33 having longitudinal directions parallel with a center axis are provided to pass through a circumferential surface of the lens protection lens barrel 31. The locking holes 32 are provided at four positions at even intervals in a circumferential direction. A fixing pin 54 that is not shown in FIGS. 1A and 1B is fixed to the lens support lens barrel 21, and is fitted in the elongated hole 33 of the lens protection lens barrel 31, as illustrated in FIG. 2A. A coil spring 53 is provided rearward more than the lens protection lens barrel 31, and the lens protection lens barrel 31 is thereby biased toward the object side. The lens support lens barrel 21 is provided with a rectangular guiding hole 22 having the same angular phase as that of the locking hole 32 of the lens protection lens barrel 31. The guiding hole 22 passes through the lens support lens barrel 21, and one end of the guiding hole 22 is covered with an inner lid ring 23 fixed to the lens support lens barrel 21 with a screw portion. A stopper dowel 51 illustrated in FIG. 2B is inserted into the guiding hole 22, and is biased by a spring 52 outwardly in a radial direction. The stopper dowel 51 extends from a hole provided in the accessory fixing lens barrel 41 to an outer peripheral attachment portion. An oblique surface is formed at a tip end portion of the stopper dowel 51, and the stopper dowel 51 is assembled so that the oblique surface faces the object side. An outer diameter of a middle tier portion of the stopper dowel 51 is set to be substantially equal to a hole diameter of a rearward circular portion of the locking hole 32, and an outer diameter of an upper tier portion thereof is set to be smaller than a width of an object-side elongated hole portion of the locking hole 32.

Under a state in which an optical accessory support lens barrel 61 is not attached, the middle tier portion of the stopper dowel 51 is fitted in the rearward circular portion of the locking hole 32, and hence the lens protection lens barrel 31 is not moved in an optical axis direction even when the lens protection lens barrel 31 is pressed from the object side. Note that, under the state in which the optical accessory support lens barrel 61 is not attached, the taper of the lens protection lens barrel 31 is in contact with the taper of the lens support lens barrel 21 and is biased by the coil spring 53, and hence rattling of the lens protection lens barrel 31 in the optical axis direction and the radial direction is prevented.

On the other hand, a screw portion is provided in an inner peripheral portion of the optical accessory support lens barrel 61, and an optical filter 12 is fixed thereto. An inner diameter of an attachment portion of the optical accessory support lens barrel 61 is substantially equal to an outer diameter of an attachment portion of the accessory fixing lens barrel 41 of the lens apparatus, and a flange 62 protruded toward the inner diameter side more than the attachment portion is provided in the optical accessory support lens barrel 61. In addition, on the inner diameter side of the attachment portion of the optical accessory support lens barrel 61, an arc-shaped locking member 72 having one end fixed to the optical accessory support lens barrel 61 is disposed, and a locking screw 71 for pressing is provided in the outer radial direction of the locking member 72.

An operation of attaching the optical accessory support lens barrel 61 in the thus-configured lens apparatus in this embodiment is described hereinbelow in detail.

First, the optical accessory support lens barrel 61 is gradually inserted into the lens apparatus from the object side thereof. After the rear end of the optical accessory support lens barrel 61 comes in contact with the stopper dowel 51, as the optical accessory support lens barrel 61 is further inserted into the lens apparatus, the stopper dowel 51 is gradually retracted in the direction of the inner diameter of the lens according to the oblique surface at the tip end thereof. When the hole through which the stopper dowel 51 has extended is covered with the optical accessory support lens barrel 61, the tip end of the stopper dowel 51 is completely retracted from the attachment portion. At this point, the middle tier portion of the stopper dowel 51 comes out of the rear circular portion of the locking hole 32. The upper tier portion of the stopper dowel 51 is smaller in diameter than the locking hole 32, so that the lens protection lens barrel 31 becomes movable in the optical axis direction in response to a pressing force from the object side. When the optical accessory support lens barrel 61 is further inserted, the flange 62 of the optical accessory support lens barrel 61 comes in contact with a stepped portion of an outer peripheral portion of the lens protection lens barrel 31, and the lens protection lens barrel 31 is moved rearward integrally with the optical accessory support lens barrel 61. The optical accessory support lens barrel 61 can be fixed to the lens apparatus by tightening the locking screw 71 when the rear end of the optical accessory support lens barrel 61 comes in contact with a flange portion of an outer periphery of the accessory fixing lens barrel 41 so as to engage the arc-shaped locking member 72 with a groove provided in the outer periphery of the accessory fixing lens barrel 41. Note that, the attachment of the optical filter 12 to the optical accessory support lens barrel 61 may be performed before or after the operation of attaching the optical accessory support lens barrel 61 to the lens apparatus.

On the other hand, the detachment of the optical accessory support lens barrel 61 from the lens apparatus is performed by pulling out the optical accessory support lens barrel 61 toward the object side after undoing the locking screw 71. The lens protection lens barrel 31 freed from pressing by the flange 62 of the optical accessory support lens barrel 61 is moved by the biasing force of the coil spring 53 toward the object side to the position where the taper provided in the lens protection lens barrel 31 comes in contact with the taper provided in the lens support lens barrel 21. At this point, the position of axis of the middle tier portion of the stopper dowel 51 is substantially coincident with the position of axis of the rear circular portion of the locking hole 32 in the optical axis direction, and hence the middle tier portion of the stopper dowel 51 is fitted in the rear circular portion of the locking hole 32 by the biasing force of the spring 52, and the lens protection lens barrel 31 becomes unmovable in the optical axis direction again.

Note that, the rotation of the lens protection lens barrel 31 relative to the lens support lens barrel 21 is prevented by the fit between the fixing pin 54 and the elongated hole 33 in this embodiment, so that the middle tier portion of the stopper dowel 51 can be fitted in the rear circular portion of the locking hole 32 with high precision.

As described above, according to the lens apparatus of this embodiment, the lens protection lens barrel 31 can be retracted in the optical axis direction in response to the simple operation of attaching the optical accessory support barrel 61 to the lens apparatus without changing the placement of the optical system. Consequently, the optical element of the optical accessory can be moved close to the lens 11 as the foremost lens of the lens apparatus without causing the optical element to interfere with the lens protection lens barrel 31, so that the lens apparatus becomes advantageous in achieving reductions in size and weight of the optical accessory.

According to the lens apparatus of this embodiment, the lens protection lens barrel 31 is not moved in the optical axis direction even when pressed from the object side under the state in which the optical accessory support lens barrel 61 is not attached, so that the lens 11 as the foremost lens of the apparatus is not damaged even when the lens apparatus without the optical accessory support lens barrel 61 attached thereto is placed on something with the lens 11 being downward.

In addition, the lens protection lens barrel 31 is retracted in the optical axis direction in response to the operation of attaching the optical accessory support lens barrel 61.

Further, the retracted lens protection lens barrel 31 is returned to the previous position before the attachment of the optical accessory and fixed in the optical axis direction in response to the operation of detaching the optical accessory support lens barrel 61, so that the lens 11 is not damaged even when the lens apparatus is placed on something with the lens 11 as the foremost lens of the lens apparatus being downward.

Further, the lens apparatus of this embodiment has multiple stopper dowels 51, so that there is little risk that the stopper dowels 51 are retracted in the direction of the inner diameter by mistake and the lens protection lens barrel 31 is moved accordingly except a case when the optical accessory support lens barrel 61 is attached, and therefore the lens apparatus of this embodiment is safe.

Second Embodiment

Figure 3A:
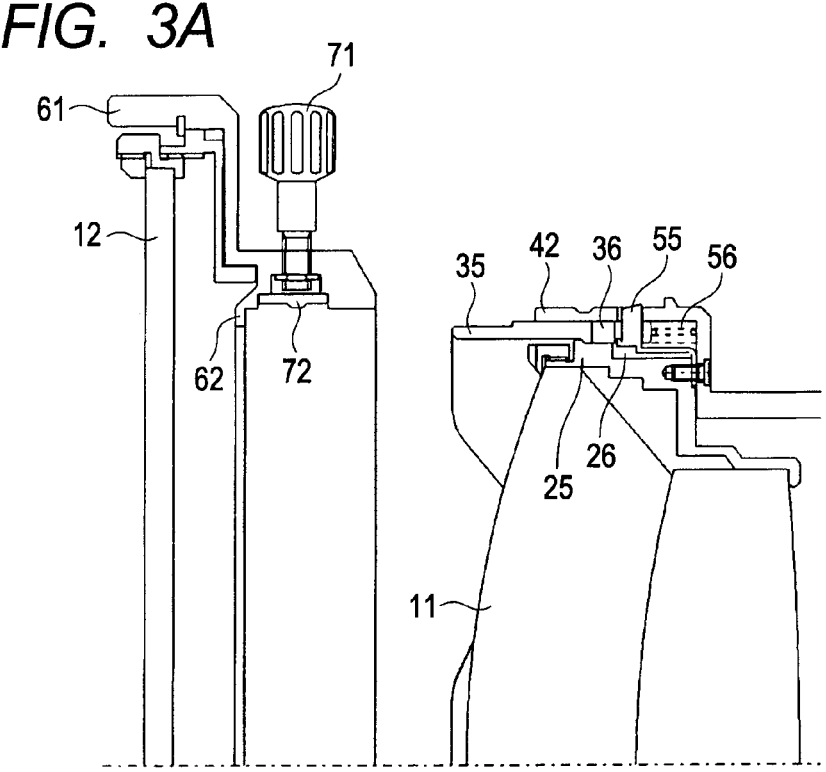
FIG. 3A is a side cross-sectional view of a lens apparatus and an optical accessory according to a second embodiment.
Figure 3B:
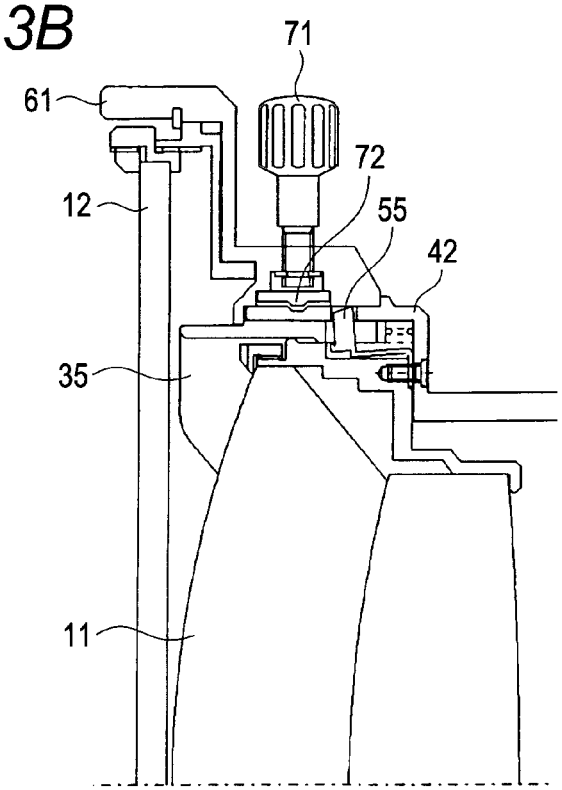
FIG. 3B is a side cross-sectional view illustrating a state in which the optical accessory is attached to the lens apparatus in the second embodiment.

FIGS. 3A and 3B are side cross-sectional views of principal portions in a second embodiment of the lens apparatus to which the present invention is applied, and the same reference numerals as those in the first embodiment denote the same members. A part of the configuration different from that in the first embodiment is described hereinbelow.

Figure 4A:
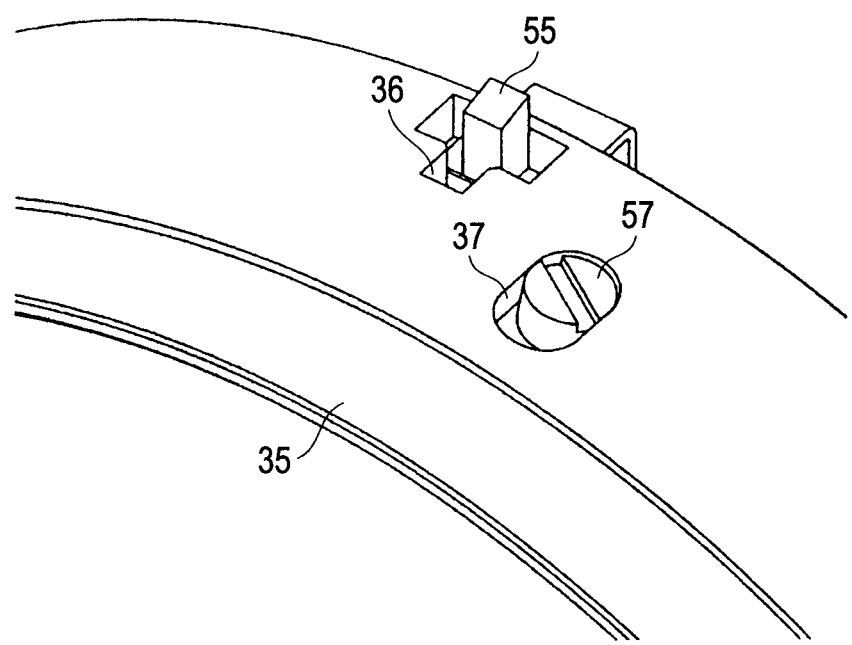
FIG. 4A is a perspective view illustrating a structure in the vicinity of a locking hole.
Figure 4B:
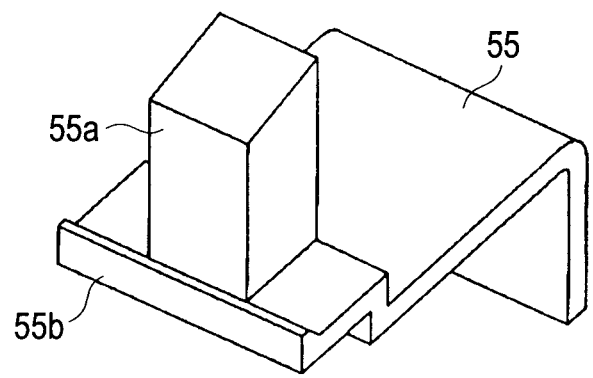
FIG. 4B is a perspective view of a locking member.

As illustrated in FIG. 4A, a T-shaped locking hole 36 and an elongated hole 37 having a longitudinal direction parallel with the center axis are provided to pass through a circumferential surface of a lens protection lens barrel 35. Four locking holes 36 are provided respectively at four positions on the lens protection lens barrel 35 at even intervals in the circumferential direction. A lens support lens barrel 25 is provided with concave stopper run-offs 26 at the same angular positions as that of the locking holes 36 of the lens protection lens barrel 35, and the stopper members 55 illustrated in FIG. 4B are disposed. The stopper member 55 extends from a hole provided in an accessory fixing lens barrel 42 to an outer peripheral attachment portion, and an oblique surface is formed at a tip end portion of the stopper member 55. A circumferential width of a projection portion 55a of the stopper member 55 is set to be smaller than a circumferential width of a hole portion on the object side of the locking hole 36 that is in parallel with the optical axis. On the other hand, a circumferential width of a locking portion 55b of the stopper member 55 is set to be larger than the circumferential width of the hole portion on the object side of the locking hole 36 that is in parallel with the optical axis, and is set to be smaller than a width of a circumferential hole on the rear of the locking hole 36.

Under the state in which the optical accessory support lens barrel 61 is not attached, as illustrated in FIG. 4A, the projection portion 55a of the stopper member 55 is positioned substantially at a point of intersection of the hole portion parallel with the optical axis and the circumferential hole portion of the locking hole 36. An interval is provided between the locking portion 55b of the stopper member 55 and the locking hole 36, where the interval is at least so large that the locking portion 55b and the locking hole 36 do not come in contact with each other even when the projection portion 55a of the stopper member 55 is pressed inwardly in the radial direction and a thin wall portion is elastically deformed. However, the interval is set to be smaller than the protrusion amount of the object-side end of the lens protection lens barrel 35 from the lens 11 as the foremost lens of the lens apparatus. With the configuration described above, under the state in which the optical accessory support lens barrel 61 is not attached, even when the lens protection lens barrel 35 is pressed from the object side, the lens protection lens barrel 35 is not moved in the optical axis direction beyond the interval distance between the locking portion 55b of the stopper member 55 and the locking hole 36.

An operation of attaching the optical accessory support lens barrel 61 in the thus-configured lens apparatus of this embodiment is described hereinbelow in detail.

First, the optical accessory support lens barrel 61 is gradually inserted into the lens apparatus from the object side thereof. After the rear end of the optical accessory support lens barrel 61 comes in contact with the stopper member 55, as the optical accessory support lens barrel 61 is further inserted into the lens apparatus to press the oblique surface of the tip end of the stopper member 55, the stopper member 55 is pressed inwardly in the radial direction of the lens. One end of the stopper member 55 is fixed to the lens support lens barrel 25, and hence the thin wall portion is elastically deformed when the tip end is pressed inwardly in the radial direction of the lens, and the vicinity of the tip end portion is retracted in the direction of the inner diameter along a substantially arc-like path. When the hole thorough which the stopper member 55 has extended is covered with the optical accessory support lens barrel 61, the tip end of the stopper member 55 is completely retracted from the attachment portion. At this point, the locking portion 55b of the stopper member 55 is retracted further inwardly of the inner diameter of the lens protection lens barrel 35, so that the lens protection lens barrel 35 becomes movable in the optical axis direction in response to the pressing force from the object side. When the optical accessory support lens barrel 61 is further inserted, the flange 62 of the optical accessory support lens barrel 61 comes in contact with a stepped portion in an outer peripheral portion of the lens protection lens barrel 35, and the lens protection lens barrel 35 is moved rearward integrally with the optical accessory support lens barrel 61. When the rear end of the optical accessory support lens barrel 61 comes in contact with a flange portion of an outer periphery of the accessory fixing lens barrel 42, the locking screw 71 is tightened, and the optical accessory support lens barrel 61 can be thereby fixed to the lens apparatus.

On the other hand, the detachment of the optical accessory support lens barrel 61 from the lens apparatus is performed by pulling out the optical accessory support lens barrel 61 toward the object side after undoing the locking screw 71. The lens protection lens barrel 35 freed from pressing by the flange 62 of the optical accessory support lens barrel 61 is moved by the biasing force of the coil spring 56 toward the object side to the position where the taper provided in the lens protection lens barrel 35 comes in contact with the taper provided in the lens support lens barrel 25. At the same time, the stopper member 55, which has been elastically deformed with its tip end portion retracted in the direction of the inner diameter, is restored back to the shape before the optical accessory support lens barrel 61 is attached to the lens apparatus by its own elastic force.

As described above, according to the lens apparatus of this embodiment, the lens protection lens barrel 35 is retracted in the optical axis direction in response to the simple operation of attaching the optical accessory support lens barrel 61 to the lens apparatus. Consequently, the optical element of the optical accessory can be moved close to the lens 11 as the foremost lens of the lens apparatus without causing the optical element to interfere with the lens protection lens barrel 35, and the lens apparatus becomes advantageous in achieving reductions in size and weight of the optical accessory.

According to the lens apparatus of this embodiment, under the state in which the optical accessory support lens barrel 61 is not attached to the lens apparatus, the object-side end of the lens protection lens barrel 35 is not moved rearwardly of the lens 11 as the foremost lens of the lens apparatus even when pressed from the object side, and hence the lens 11 as the foremost lens is not damaged even when the lens apparatus without the optical accessory support lens barrel 61 attached thereto is placed on something with the lens 11 being downward.

In addition, the lens protection lens barrel 35 is retracted in the optical axis direction in response to the operation of attaching the optical accessory support lens barrel 61.

Further, the retracted lens protection lens barrel 35 is returned to the previous position before the attachment of the optical accessory and fixed in the optical axis direction in response to the operation of detaching the optical accessory support lens barrel 61, so that the lens 11 is not damaged even when the lens apparatus is placed on something with the lens 11 as the foremost lens of the lens apparatus being downward.

Further, the lens apparatus of this embodiment has multiple stopper members 55, so that there is little risk that the stopper members 55 are retracted in the direction of the inner diameter by mistake and the lens protection lens barrel 35 is moved accordingly except when the optical accessory support lens barrel 61 is attached, and therefore the lens apparatus of this embodiment is safe.

Third Embodiment

Figure 5A:
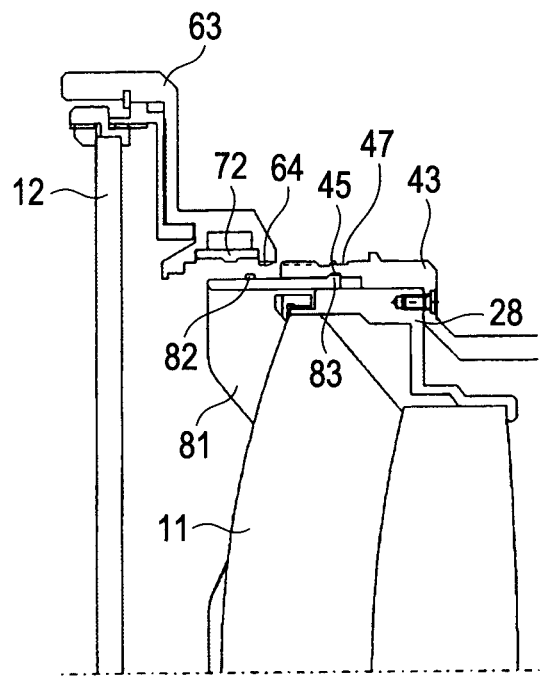
FIG. 5A is a side cross-sectional view of a lens apparatus and an optical accessory according to a third embodiment.
Figure 5B:
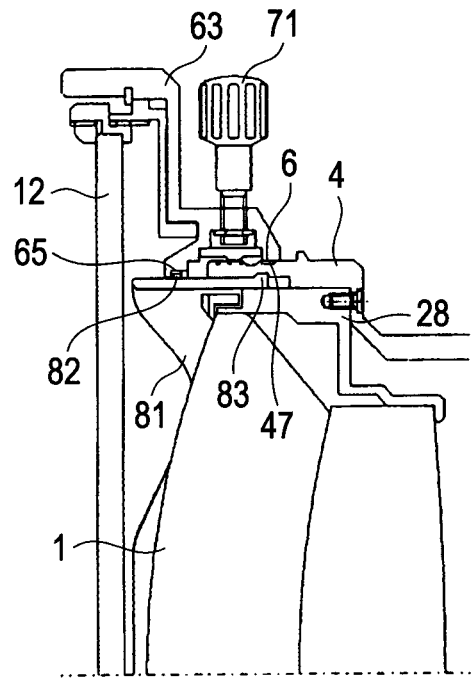
FIG. 5B is a side cross-sectional view illustrating a process of attaching the optical accessory to the lens apparatus.
Figure 5C:
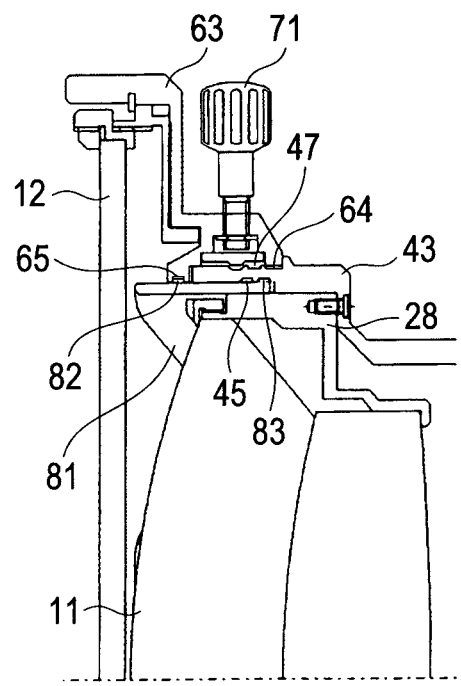
FIG. 5C is a side cross-sectional view illustrating a state in which the optical accessory is attached to the lens apparatus in the third embodiment.
Figure 6:
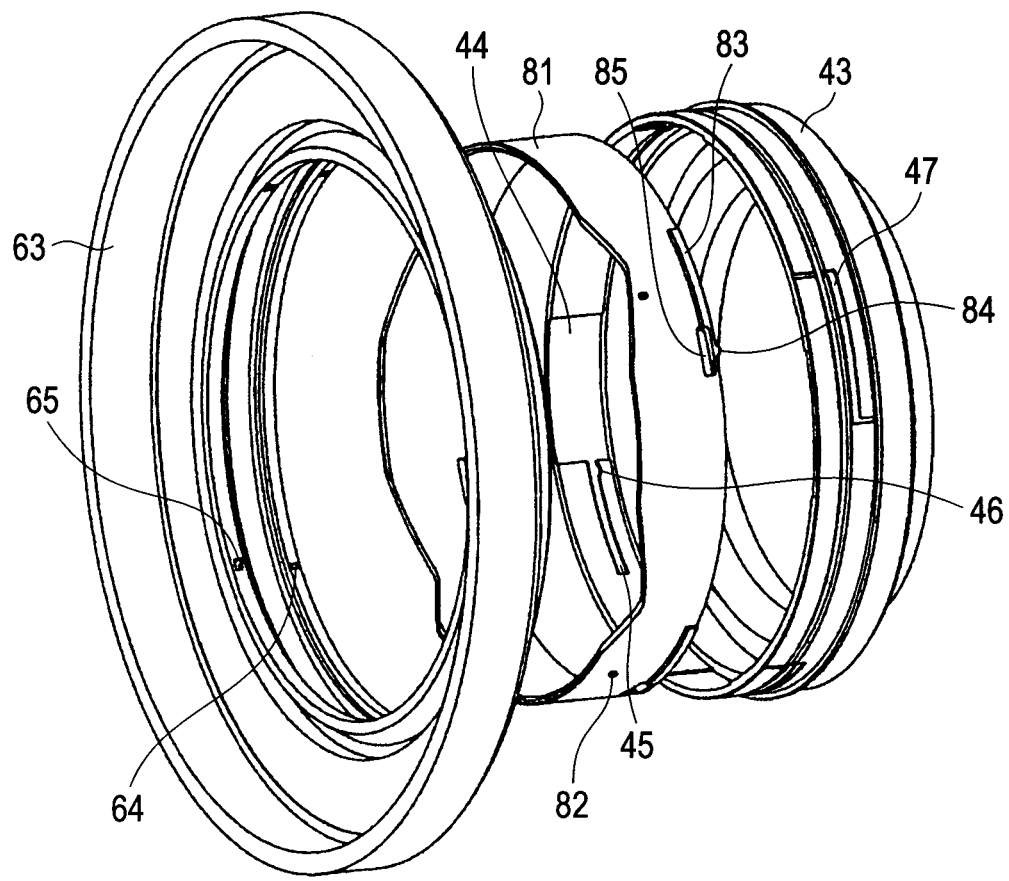
FIG. 6 is an exploded perspective view in which principal components of the third embodiment are arranged.

FIGS. 5A, 5B, and 5C are side cross-sectional views of principal portions in a third embodiment of the lens apparatus to which the present invention is applied, and the same reference numerals as those in the first embodiment denote the same members. In addition, FIG. 6 is an exploded perspective view in which an optical accessory support lens barrel 63, a lens protection lens barrel 81, and an accessory fixing lens barrel 43 according to this embodiment are schematically arranged.

Figure 7A:
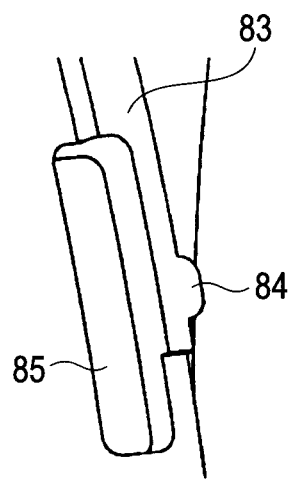
FIG. 7A is a partially enlarged view illustrating the vicinity of a projection c of FIG. 6.
Figure 7B:
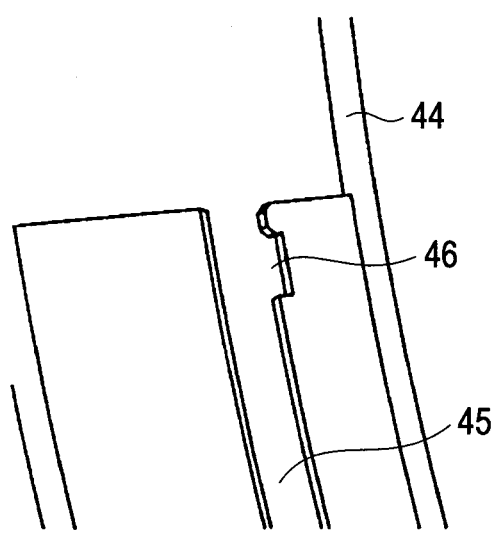
FIG. 7B is a partially enlarged view illustrating the vicinity of a click groove of FIG. 6.

The lens apparatus is a wide-angle type lens apparatus in which an object-side end of the lens protection lens barrel 81 is protruded forward of the lens 11 as the foremost lens of the apparatus, and notches are provided in the lens barrel so as to prevent four corners of the image pickup range from being vignetted. An inner diameter of the lens protection lens barrel 81 is fitted on a lens support lens barrel 28, and is slidable. An outer peripheral portion of the lens protection lens barrel 81 is formed with a projection b 82 and an arc-shaped flange portion 83. In addition, a part of a rear end of the flange portion 83 is formed with a projection c 84, as illustrated in FIG. 7A. A hole 85 is provided on the object side of the projection c 84, and the vicinity of the projection c 84 of the lens protection lens barrel 81 is elastically deformable. Each of the above-mentioned projection b 82, flange portion 83, projection c 84, and hole 85 is provided at four positions at even intervals in a circumferential direction. The lens protection lens barrel 81 is slidably attached to the accessory fixing lens barrel 43. On an inner peripheral side of the accessory fixing lens barrel 43, a flange run-off 44 is provided and the flange portion 83 of the lens protection lens barrel 81 is allowed to slide in the optical axis direction by the flange run-off 44, and an engagement groove 45 is provided and the flange portion 83 is allowed to slide in the circumferential direction by the engagement groove 45. The flange run-off 44 is partially coupled to the engagement groove 45. A click groove 46 is provided in a part of the engagement groove 45, as illustrated in FIG. 7B. Each of the above-mentioned flange run-off 44, engagement groove 45, and click groove 46 is provided at four positions at even intervals in the circumferential direction. In a shooting state without using an attached optical accessory, the flange portion 83 of the lens protection lens barrel 81 is engaged with the engagement groove 45 of the accessory fixing lens barrel 43, and the projection c 84 is in contact with a side surface of the click groove 46. At this point, the vicinity of the projection c 84 of the lens protection lens barrel 81 is elastically deformed, and the lens protection lens barrel 81 is biased toward the object side by its own elastic force. A taper is provided on the object side of each of the flange portion 83 and the engagement groove 45, so that rattling of the lens protection lens barrel 81 in the shooting state without using the attached optical accessory in the optical axis direction and the radial direction is prevented. In addition, the flange portion 83 is engaged with the engagement groove 45, so that the lens protection lens barrel 81 is not moved in the optical axis direction even when pressed from the object side.

When the lens protection lens barrel 81 is rotated relative to the accessory fixing lens barrel 43 clockwise when viewed from the object side with a biasing force of specific torque or more, the vicinity of the projection c 84 of the lens protection lens barrel 81 is further elastically deformed, and the projection c 84 can move out of the click groove 46. The lens protection lens barrel 81 is further rotated until phases of the flange portion 83 and the flange run-off 44 match each other, and thus the lens protection lens barrel 81 becomes movable in the optical axis direction.

That is, with the engagement of the flange portion 83 as a part of the lens protection lens barrel 81 with the flange run-off 44 and the engagement groove 45 (locking member) that are formed on the inner peripheral side of the accessory fixing lens barrel 43, the lens protection lens barrel 81 becomes slidable relative to the accessory fixing lens barrel 43 in the optical axis direction only at a specific phase in the circumferential direction. Moreover, only when the lens protection lens barrel 81 is at a specific position in the optical axis direction relative to the accessory fixing lens barrel 43, the lens protection lens barrel 81 becomes slidable relative to the accessory fixing lens barrel 43 in the circumferential direction within the range of the specific phase in the circumferential direction.

Figure 7C:
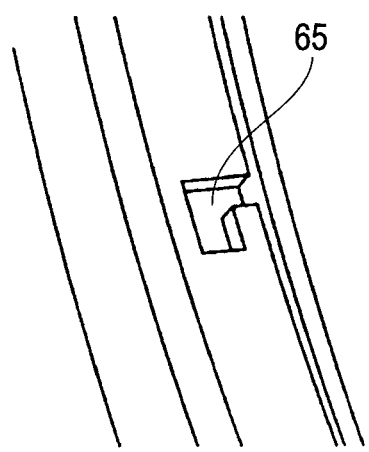
FIG. 7C is a partially enlarged view illustrating the vicinity of a hook groove of FIG. 6.

On the other hand, the configuration of the optical accessory support lens barrel 63 is different from that of the first embodiment only in a shape of an attachment portion. On an inner diameter side of the attachment portion of the optical accessory support lens barrel 63, a projection a 64 and an L-shaped hook groove 65 illustrated in FIG. 7C are provided. Dimensions of the projection a 64 are set so that the projection a 64 can be accommodated in a crank-shaped guiding groove 47 provided in an outer periphery of the accessory fixing lens barrel 43. In addition, dimensions of the hook groove 65 are set so that the projection b 82 of the lens protection lens barrel 81 can be accommodated therein. Each of the above-mentioned projection a 64, hook groove 65, and guiding groove 47 is provided at four positions at even intervals in the circumferential direction.

An operation of attaching the optical accessory support lens barrel 63 in the thus-configured lens apparatus of this embodiment is described hereinbelow in detail.

First, the optical accessory support lens barrel 63 is gradually inserted into the lens apparatus from the object side thereof with the projection a 64 fitted in the guiding groove 47. As illustrated in FIG. 5B, at the same time as the projection a 64 reaches a circumferential groove portion of the guiding groove 47, the projection b 82 is accommodated in the hook groove 65.

Subsequently, when the optical accessory support lens barrel 63 is rotated clockwise as viewed from the object side with the biasing force of specific torque or more with the projection a 64 fitted in the circumferential groove portion of the guiding groove 47, the lens protection lens barrel 81 having the projection b 82 hooked in the hook groove 65 starts to be rotated integrally with the optical accessory support lens barrel 63. Note that, when a small biasing force of the specific torque or less is applied to the optical accessory support lens barrel 63, the projection c 84 cannot move out of the click groove 46, so that the optical accessory support lens barrel 63 and the lens protection lens barrel 81 cannot be rotated.

At the same time as the projection a 64 reaches the end of the circumferential groove portion of the guiding groove 47 by the rotation operation, the flange portion 83 is set to reach the same phase as that of the flange run-off 44. From this state, when the optical accessory support lens barrel 63 is further inserted rearward with the projection a 64 fitted in the guiding groove 47, as illustrated in FIG. 5C, the lens protection lens barrel 81 is moved rearward integrally with the optical accessory support lens barrel 63.

When the rear end of the optical accessory support lens barrel 63 comes in contact with a flange portion of the outer periphery of the accessory fixing lens barrel 43, the locking screw 71 is tightened, and the optical accessory support lens barrel 63 can be thereby fixed to the lens apparatus.

On the other hand, the detachment of the optical accessory support lens barrel 63 from the lens apparatus is performed in the manner described below.

After undoing the locking screw 71, with the projection a 64 fitted in the guiding groove 47, the optical accessory support lens barrel 63 is firstly pulled out toward the object side. At this point, the lens protection lens barrel 81 having the projection b 82 hooked in the hook groove 65 is moved toward the object side integrally with the optical accessory support lens barrel 63.

As illustrated in FIG. 5B, after the projection a reaches the circumferential groove portion of the guiding groove 47, when the optical accessory support lens barrel 63 is rotated counterclockwise as viewed from the object side with the projection a 64 fitted in the guiding groove 47, the lens protection lens barrel 81 is rotated integrally with the optical accessory support lens barrel 63, and the flange portion 83 is gradually engaged with the engagement groove 45. When the biasing force of the specific torque or more is applied to the optical accessory support lens barrel 63 as the projection c 84 at the rear end of the flange portion 83 comes in contact with an entrance of the engagement groove 45, the vicinity of the projection c 84 of the lens protection lens barrel 81 is elastically deformed, and the projection c 84 is accommodated in the engagement groove 45. When phases of the projection c 84 and the click groove 46 match each other, the projection c 84 is fitted in the click groove 46, and the lens protection lens barrel 81 is substantially fixed to the accessory fixing lens barrel 43 both in the optical axis direction and the circumferential direction.

At the same time as the projection c 84 is fitted in the click groove 46, the projection a 64 reaches the end of the circumferential groove portion of the guiding groove 47, and the hooking of the projection b 82 in the hook groove 65 is released. In this state, the optical accessory support lens barrel 63 is pulled out toward the object side with the projection a 64 fitted in the guiding groove 47, and the optical accessory support lens barrel 63 can be thereby detached from the lens apparatus.

As described above, according to the lens apparatus of this embodiment, the lens protection lens barrel 81 is retracted in the optical axis direction in response to the simple operation of attaching the optical accessory support lens barrel 63 to the lens apparatus. Consequently, the optical element of the optical accessory can be moved close to the lens 11 as the foremost lens of the lens apparatus without causing the optical element to interfere with the lens protection lens barrel 81, and hence the lens apparatus becomes advantageous in achieving reductions in size and weight of the optical accessory.

According to the lens apparatus of this embodiment, under the state in which the optical accessory support lens barrel 63 is not attached to the lens apparatus, the lens protection lens barrel 81 is not moved in the optical axis direction even when pressed from the object side, and hence the lens 11 as the foremost lens of the lens apparatus is not damaged even when the lens apparatus without the optical accessory support lens barrel 63 attached thereto is placed on something with the lens 11 being downward.

In addition, the lens protection lens barrel 81 is retracted in the optical axis direction in response to the operation of attaching the optical accessory support lens barrel 63.

Further, the retracted lens protection lens barrel 81 is returned to the previous position before the attachment of the optical accessory and fixed in the optical axis direction in response to the operation of detaching the optical accessory support lens barrel 63, so that the lens 11 is not damaged even when the lens apparatus is placed on something with the lens 11 as the foremost lens of the lens apparatus being downward.

Fourth Embodiment

Figure 8A:
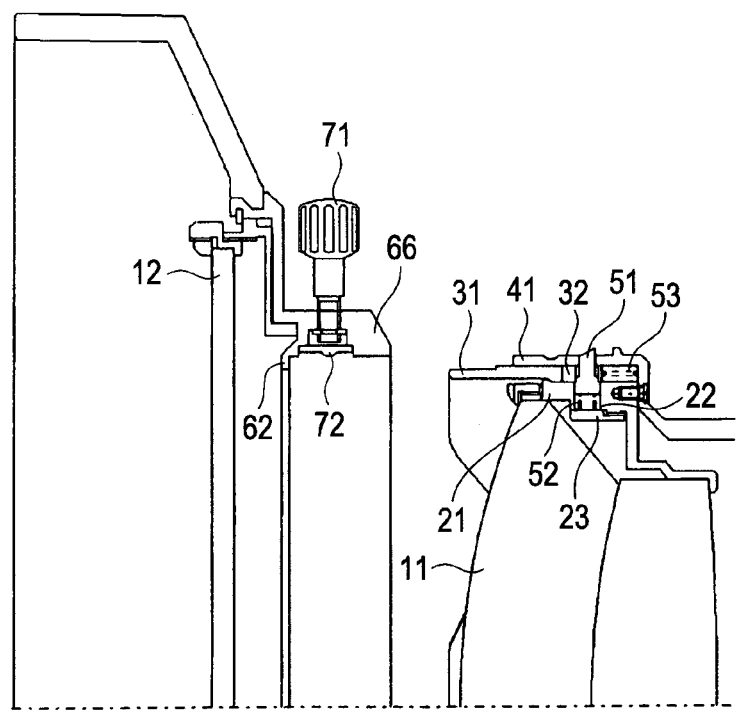
FIG. 8A is a side cross-sectional view of a lens apparatus and an optical accessory according to a fourth embodiment.
Figure 8B:
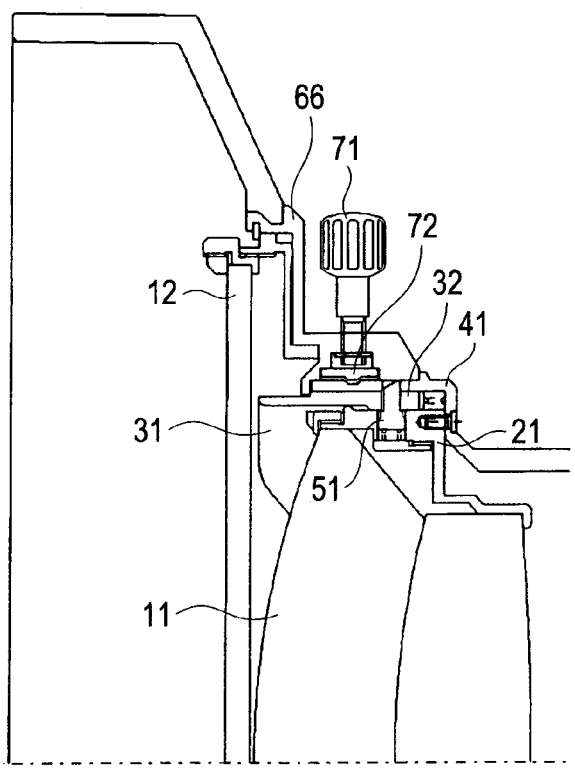
FIG. 8B is a side cross-sectional view illustrating a state in which the optical accessory is attached to the lens apparatus in the fourth embodiment.

In each of the first to third embodiments described above, the optical accessory is fixed to the optical accessory support lens barrel. However, the optical accessory support lens barrel may have a function other than the function of supporting the optical accessory. The present invention is also applicable to, for example, the case where a hood fixing lens barrel 66 provided with an optical accessory support part is attached to the lens apparatus, as illustrated in FIGS. 8A and 8B.

Fifth Embodiment

Figure 9A:
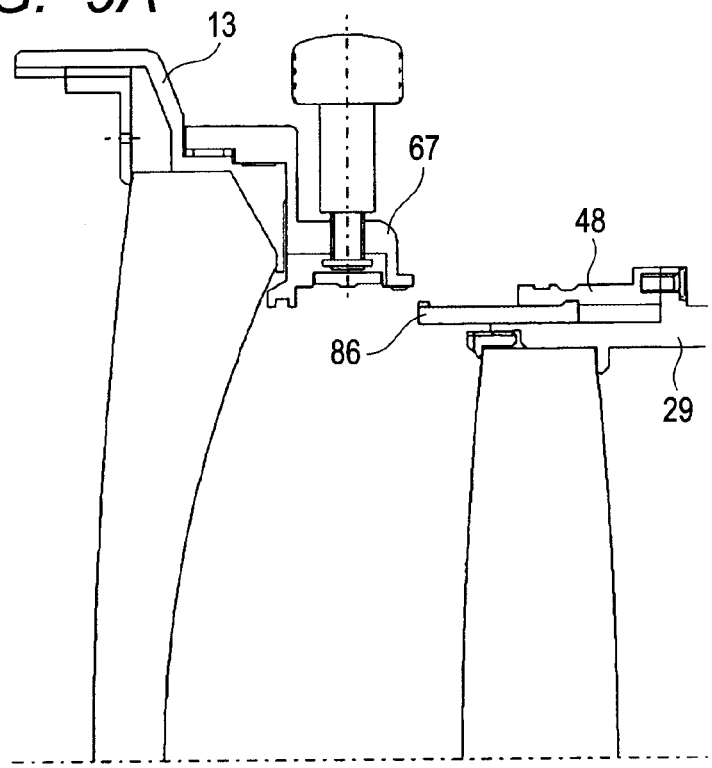
FIG. 9A is a side cross-sectional view of a lens apparatus and an optical accessory according to a fifth embodiment.
Figure 9B:
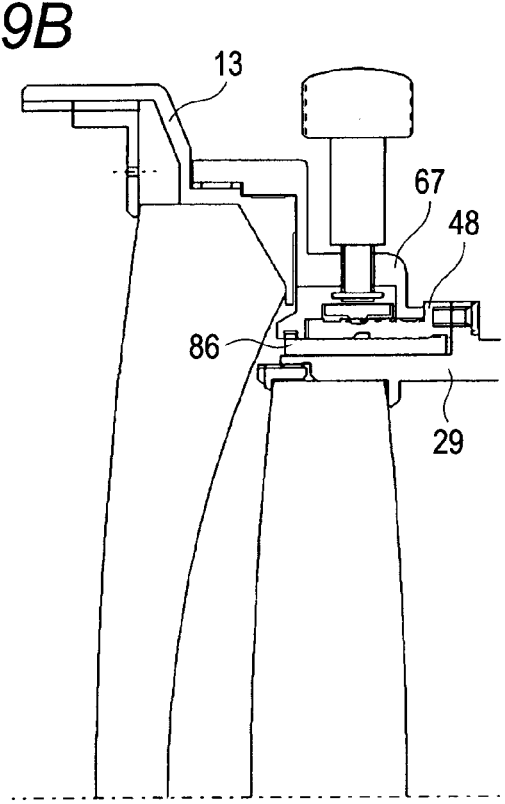
FIG. 9B is a side cross-sectional view illustrating a state in which the optical accessory is attached to the lens apparatus in the fifth embodiment.

In each of the first to fourth embodiments described above, the lens apparatus illustrated in the drawings is the wide-angle type lens apparatus. However, the scope of the present invention is not limited thereto. In addition, in each of the first to fourth embodiments described above, the optical accessory illustrated in the drawings is the optical filter. However, the scope of the present invention is not limited thereto. The present invention is also applicable to, for example, the case where an optical accessory 13 other than the optical filter is attached to an optical system lens apparatus other than the wide-angle type lens apparatus, as illustrated in FIGS. 9A and 9B. The configuration of an optical accessory support lens barrel 67, a lens support lens barrel 29, a lens protection lens barrel 86, and an accessory fixing lens barrel 48, and an operation method are substantially identical to those in the third embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-274628, filed Dec. 2, 2009, which is hereby incorporated by reference herein in its entirety.

What is claimed is:

1. A lens apparatus capable of attaching an optical accessory on an object side thereof, comprising a lens protector, wherein:
    the lens protector at an object-side end of the lens apparatus is retracted in an optical axis direction in response to attachment of an optical accessory supporter supporting the optical accessory without changing placement of an optical system of the lens apparatus; and
    the lens protector retracted in the optical axis direction is returned to a position before the attachment of the optical accessory supporter by detaching the optical accessory supporter from the lens apparatus.

2. A lens apparatus according to claim 1, wherein, when the optical accessory supporter is detached, the lens protector is not retracted in the optical axis direction even when the lens protector barrel is pressed in the optical axis direction.

3. A lens apparatus according to claim 2, comprising a locking member which is biased outwardly in a radial direction by a biasing unit, extends to an attachment portion of the optical accessory supporter of the lens apparatus, and locks movement of the lens protector in the optical axis direction, wherein
    the locking member is pressed inwardly in the radial direction in response to the attachment of the optical accessory supporter, so that locking of the lens protector in the optical axis direction is released.

4. A lens apparatus according to claim 3, comprising multiple locking members.

5. A lens apparatus according to claim 4, wherein the locking member and the biasing unit are integrally formed.

6. A lens apparatus according to claim 3, wherein the locking member and the biasing unit are integrally formed.

7. A lens apparatus according to claim 2, wherein:
    a lens barrel of the lens apparatus to which the lens protector is slidably attached includes a locking portion engaged with a part of the lens protector; and
    the part of the lens protector and the locking portion are configured so that the lens protector is slidable in the optical axis direction relative to the lens barrel only at a specific phase in a circumferential direction, and that the lens protector is slidable in the circumferential direction within a specific range of phase in the circumferential direction only when the lens protector is at a specific position in the optical axis direction relative to the lens barrel.

8. A lens apparatus according to claim 1, wherein the optical accessory supporter includes an optical filter.

9. A lens apparatus according to claim 8, wherein the optical accessory supporter includes a hood.

10. A lens apparatus according to claim 1, wherein the lens protector is disposed away from the optical accessory by a predetermined distance when the lens protector is retracted in an optical axis direction in response to attachment of the optical accessory supporter.

11. A lens apparatus according to claim 1, wherein the lens protector is disposed away from an optical member disposed on the most object side in by a predetermined distance when the lens protector is retracted in an optical axis direction in response to attachment of the optical accessory supporter.

* * * * *